(12) United States Patent  (10) Patent No.: US 7,783,137 B2
Yamada et al.  (45) Date of Patent: Aug. 24, 2010

(54) IMAGE READING APPARATUS CAPABLE OF MANAGEMENT OF PERSONAL INFORMATION

(75) Inventors: Tatsutoshi Yamada, Toyokawa (JP);
Tatsuya Eguchi, Toyohashi (JP);
Kiyohito Tsujihara, Aichi-ken (JP);
Hiroshi Eguchi, Okazaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 958 days.

(21) Appl. No.: 11/594,728

(22) Filed: Nov. 9, 2006

(65) Prior Publication Data

US 2008/0031546 A1  Feb. 7, 2008

(30) Foreign Application Priority Data

Aug. 4, 2006  (JP) .............................. 2006-213531

(51) Int. Cl.
*G06K 9/60* (2006.01)
*G06K 9/20* (2006.01)

(52) U.S. Cl. ..................................... 382/305; 382/312

(58) Field of Classification Search ................. 382/115, 382/305, 312, 315; 707/1, 100; 358/1.16, 358/505
See application file for complete search history.

(56) References Cited

U.S. PATENT DOCUMENTS

| | | | |
|---|---|---|---|
| 6,813,395 B1 * | 11/2004 | Kinjo | 382/305 |
| 6,961,870 B2 * | 11/2005 | Chiu et al. | 714/11 |
| 7,081,965 B2 * | 7/2006 | Taniguchi | 358/1.15 |
| 7,106,461 B2 * | 9/2006 | Kakigi et al. | 358/1.12 |
| 7,421,154 B2 * | 9/2008 | Kinjo | 382/305 |

FOREIGN PATENT DOCUMENTS

| | | |
|---|---|---|
| JP | 8-251373 | 9/1996 |
| JP | 9-55839 | 2/1997 |
| JP | 9-55840 | 2/1997 |
| JP | 11-88633 | 3/1999 |
| JP | 2001-36675 | 2/2001 |
| JP | 2001-101178 | 4/2001 |
| JP | 2004-102543 | 4/2004 |
| JP | 2005-227839 A | 8/2005 |
| JP | 2005-311990 | 11/2005 |

OTHER PUBLICATIONS

Japanese Office Action mailed on Feb. 10, 2009 directed at counterpart application No. 2006-213531;12 pages.
Japanese Office Action, mailed Jul. 15, 2008, directed to counterpart Japanese Patent Application No. 2006-213531; 5 pages.

* cited by examiner

*Primary Examiner*—Kanji Patel
(74) *Attorney, Agent, or Firm*—Morrison & Foerster LLP

(57) ABSTRACT

An image formation apparatus detects personal information, (a name, a contact address or the like) from image data obtained by scanning a document. Personal information stored in a database, or DB personal information, associated with an and retrieved personal information have a difference and the DB personal information is information later than the personal information detected from the image data then the personal information in the image data is modified with the retrieved DB personal information.

16 Claims, 14 Drawing Sheets

FIG.5

| EMPLOYEE NO. 401 | NAME 402 | DATE OF ASSIGNMENT 403 | NAME OF DEPT. EMPLOYEE IS ASSIGNED TO 404 | PHONE NO. 405 | FAX NO. 406 | LOCATION 407 | DATA REGISTRATION DATE 408 |
|---|---|---|---|---|---|---|---|
| 10001 | TARO SUZUKI | 2005/10/1 | DEVELOPMENT DEPT., 1ST SEC. | 045-678-1456 | 045-678-1467 | YOKOHAMA | 2005/10/1 |
| 10001 | TARO SUZUKI | 2004/10/1 | PRODUCTION DEPT., 1ST SEC. | 052-321-5678 | 052-321-5669 | NAGOYA | 2004/10/1 |
| 10001 | TARO SUZUKI | 2003/10/1 | DEVELOPMENT DEPT., 3RD SEC. | 052-123-6789 | 052-123-6779 | NAGOYA | 2003/10/1 |
| 10001 | TARO SUZUKI | 2002/10/1 | DEVELOPMENT DEPT., 2ND SEC. | 045-678-1345 | 045-678-1356 | YOKOHAMA | 2002/10/1 |
| 10001 | TARO SUZUKI | 2001/10/1 | DEVELOPMENT DEPT., 1ST SEC. | 045-678-1234 | 045-678-1245 | YOKOHAMA | 2001/10/1 |
| 10001 | TARO SUZUKI | 2001/4/1 | PERSONNEL DEPT. | 03-1234-5678 | 03-1234-5689 | TOKYO | 2001/4/1 |

IMAGE READING APPARATUS CAPABLE OF MANAGEMENT OF PERSONAL INFORMATION

This application is based on Japanese Patent Application No. 2006-213531 filed with the Japan Patent Office on Aug. 4, 2006, the entire content of which is hereby incorporated by reference.

BACKGROUND OF THE INVENTION

1. Field of the Invention

The present invention relates generally to image reading apparatuses, image reading apparatus controlling programs and methods of controlling image reading apparatuses, and particularly to such apparatuses, programs and methods enabling personal-information management.

2. Description of the Related Art

Conventionally, an image reading apparatus has been known such as a multi function peripheral (MFP) including a scanner reading an image of an original and a function allowing the image read by the scanner to be copied on a sheet. The MFP is capable of externally transmitting an image for example through a facsimile line and externally receiving image data and printing the data on a sheet.

Japanese Laid-Open Patent Publication No. 2001-036675 discloses an image transmission apparatus that prevents facsimile communication transmitted to a wrong destination as an input is incorrectly done or the like and to do so the apparatus recognizes and displays the destination's telephone number indicated in an image of an original at a particular area and urges the user to confirm whether the transmission of interest may be done for the displayed destination's telephone number. The user confirms accordingly and as a result if the transmission is not allowed then the apparatus urges the user to correct the telephone number, and displays the corrected telephone number and urges the user to confirm whether the transmission may be done for that telephone number. If the telephone number is confirmed it is registered.

Japanese Laid-Open Patent Publication No. 2005-311990 discloses a transmission apparatus that compares a destination's facsimile number received from an operation input unit with the destination's facsimile number read from an original to be transmitted, and if the comparison provides a result that the numbers match, then the apparatus transmits the original's image data, otherwise the apparatus displays a message urging the user to confirm the facsimile number.

Japanese Laid-Open Patent Publication No. 11-088633 discloses an E-mail transmission and reception system allowing a read image to arrive at a correct destination, rather than a wrong destination. To do so, the publication discloses that from the read image the destination's E-mail address and/or similar communication information is/are recognized and stored, and displayed. The user refers to displayed addresses and/or similar communication information and therefrom selects and inputs a destination. The read image is transmitted to the selected E-mail address. The stored E-mail addresses and/or other communication information are supplementarily corrected by a request transmitted on a network to correct communication information.

Japanese Laid-Open Patent Publication No. 2004-102543 discloses an information collection system which resolves the inconvenience of bringing home catalogs, CD-ROMs and the like distributed as materials in exhibitions and the like. An image associated with string information, such as a bar code, is shot and transmitted via E-mail to a server. The server searches for and retrieves the string information associated with the image and searches for a Web page associated with the detected string information. The server puts the retrieved result and information contained in the E-mail together to create a HTML document, and issues a URL corresponding to the HTML document and transmits the URL to the device that shot the image.

If a document is to include a contact address or similar personal information (e.g., an address, a telephone number, a facsimile number, an E-mail address and/or the like), then the person in charge of creating the document must carefully do so to indicate the latest, correct contact address therein, which is cumbersome.

Furthermore, if a document is copied and distributed to a destination, and the recipient refers to a contact address indicated in the distributed article to make contact with the address, the recipient must confirm that the address is the latest, correct address, which is cumbersome. The techniques disclosed in Japanese Laid-Open Patent Publication Nos. 2001-036675 and 2005-311990 also require users to confirm correct contact addresses.

Furthermore, if a contact address included in a document is referred to make contact with a person in charge, and the contact address is obsolete or unupdated, the contact cannot be done. For facsimile, E-mail addresses and the like, if a document is sent to a wrong place, it nevertheless incurs a reception fee and causes inconvenience to the recipient as the recipient is involved for example in searching for the intended recipient, a process for returning the transmission, and the like. Furthermore, if the document is open, personal information, classified information and the like may leak.

Furthermore, there has also been a case in which in order to confirm whether a contact address or similar personal information is the latest information, a user accesses a database, which is unupdated, resulting in erroneous modification. In other words, this leads to inviting a confusion in which information is for real. Furthermore, if the database holds obsolete information, it is also necessary to take time and trouble to update it. The technique disclosed in Japanese Laid-Open Patent Publication No. 11-088633 provides erroneous modification if a request issued to correct communication information is based on obsolete data.

SUMMARY OF THE INVENTION

The present invention has been made to overcome the above described disadvantages and it contemplates an image reading apparatus, an image reading apparatus controlling program, and a method of controlling the image reading apparatus, that enable appropriate management of personal information.

To achieve the above object the present invention in one aspect provides an image reading apparatus including: an acquisition unit acquiring image data by scanning a document; a storage unit storing the image data acquired; a detection unit detecting as first personal information personal information present in the image data acquired; a search and retrieval unit searching a database and retrieving therefrom as second personal information personal information associated with an individual specified by the first personal information detected; a comparison unit comparing the first personal information with the second personal information; and a modification unit modifying the personal information present in the image data stored with the second personal information if the comparison unit provides a result indicating that the second personal information is information later than the first personal information, and modifying data present in the database with the first personal information if the comparison unit provides a result indicating that the first personal information is information later than the second personal information.

The present invention in another aspect provides an image reading apparatus including: an acquisition unit acquiring image data by scanning a document; a storage unit storing the image data acquired; a detection unit detecting as first personal information personal information present in the image data acquired; a search and retrieval unit searching a database and retrieving therefrom as second personal information personal information associated with an individual specified by the first personal information detected; a comparison unit comparing the first personal information with the second personal information; and a selection unit displaying a result of comparing the first and second personal information by the comparison unit indicating that the first and second personal information have a difference, and receiving that one of the first and second personal information is selected.

The present invention can thus provide an image reading apparatus, image reading apparatus controlling program, and method of controlling the image reading apparatus, that enables appropriate management of personal information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a specific example of a table stored in database 111.

DESCRIPTION OF THE PREFERRED EMBODIMENTS

First Embodiment

Figure 1:
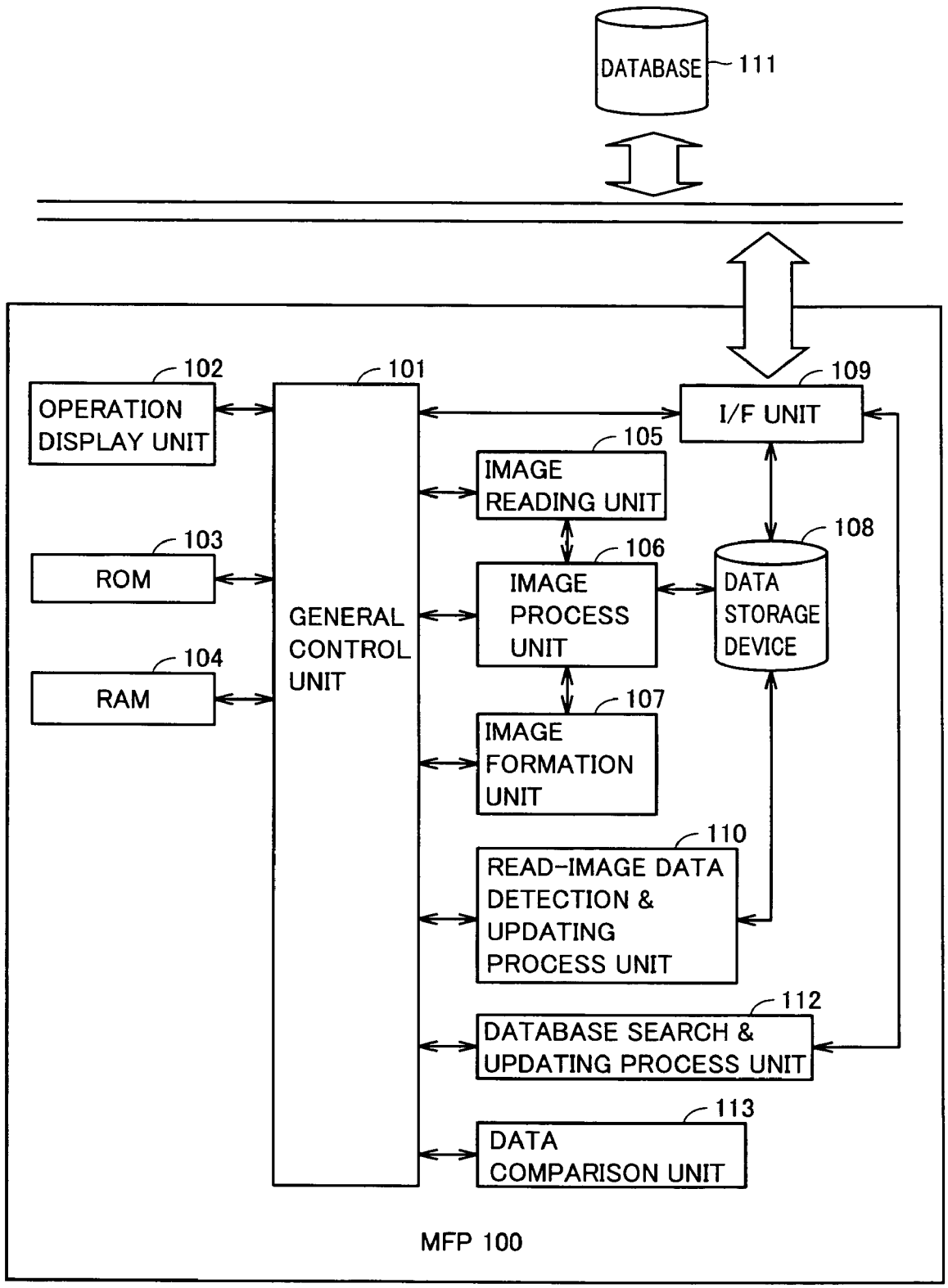
FIG. 1 is a block diagram schematically showing a configuration of an MFP in a first embodiment of the present invention.

FIG. 1 is a block diagram schematically showing a configuration of an MFP as an image reading apparatus in a first embodiment of the present invention.

With reference to FIG. 1, an MFP 100 is configured of an operation display unit 102 performing a setting of an operation of a variety of functions and displaying a confirmation of a set function, a variety of warning and the like, an image reading unit 105 scanning and thus reading an image and converting the read image to electronic data, an image process unit 106 subjecting the read image data to a variety of image processes, an image formation unit 107 printing out through a known electrophotography process the electronic data having undergone the image process, a data storage device 108 storing the image data therein, a ROM 103 used as a working memory in a variety of processes, a RAM 104 and a general control unit 101 generally controlling them.

Operation display unit 102 is configured of a liquid crystal display device and a touch panel mounted therein and is capable of displaying in information and receiving information from a user.

Furthermore, MFP 100 has an interface (I/F) unit 109 serving as a contact allowing information to be communicated in a process for accessing data in database 111 connected to a network, a read-image data detection and updating process unit 110 detecting personal information, date information and the like from read data in data storage device 108, modifying personal information of read data, and the like, a database searching and updating process unit 112 accessing the database to search for personal information, performing a process for updating particular data, and the like, and a data comparison unit 113 comparing personal information detected from read data and data retrieved from the database and associated with the personal information.

Read-image data detection and updating process unit 110, database searching and updating process unit 112, and data comparison unit 113 are configurations functionally implemented by a processor (or general control unit 101) executing a program (or by a hardware circuit).

The MFP scans a document to obtain image data and from the image data detects and extracts personal information. The extracted personal information is compared with that in the database which corresponds thereto. If they fail to match, new information replaces obsolete information.

The MFP has a function scanning a document, a function storing image data obtained by scanning, a function detecting personal information in the scanned image data, a function connecting to the database through a network, a function searching the database for personal information associated with an individual specified by the detected personal information, and a function comparing the personal information detected from the document with that retrieved from the database.

If as a result of the comparison there is a difference between the personal information detected from the document and that retrieved the database and the latter's date information is later than the former's date information, then the former is corrected by the latter. The corrected data may be output in the form of a copy and thus distributed, or may be attached to E-mail and thus distributed.

If as a result of the comparison there is a difference between the personal information detected from the document and that retrieved the database and the former's date information is later than the latter's date information, then the latter is corrected by the former.

Figure 2:
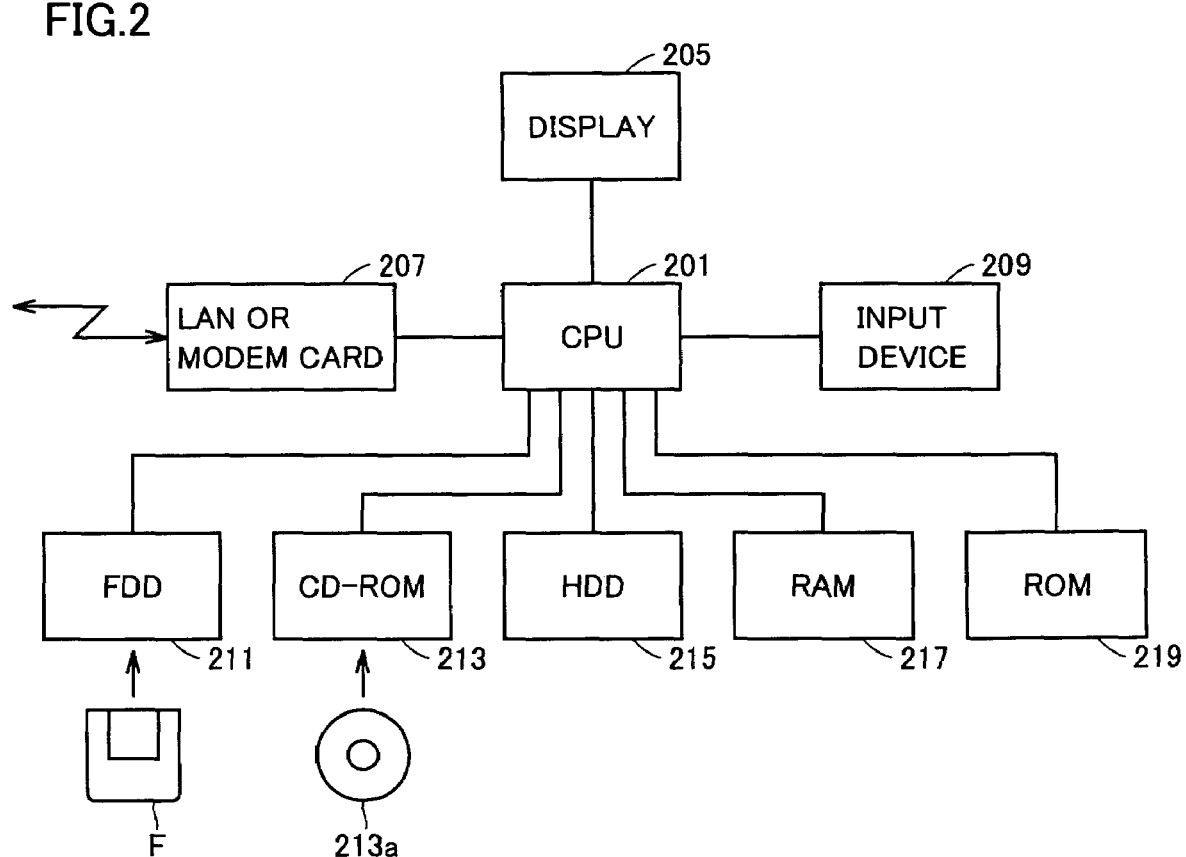
FIG. 2 is a block diagram showing a configuration of a database 11 shown in FIG. 1.

FIG. 2 is a block diagram showing a configuration of database 111 shown in FIG. 1.

With reference to the figure, database 111 is a server and includes a CPU 201 generally controlling the apparatus, a display 205, a local area network (LAN) card 207 (or a modem card) employed to connect to the network, externally communicate, and the like, an input device 209 implemented by a keyboard, a mouse and/or the like, a flexible disk drive 211, a CD-ROM drive 213, a hard disk drive 215, a RAM 217, and a ROM 219.

Flexible disk drive 211 allows a program, an image and other similar data recorded on a flexible disk F to be read, and CD-ROM drive 213 allows a program, an image and other similar data recorded on a CD-ROM 213*a* to be read.

Figure 3:
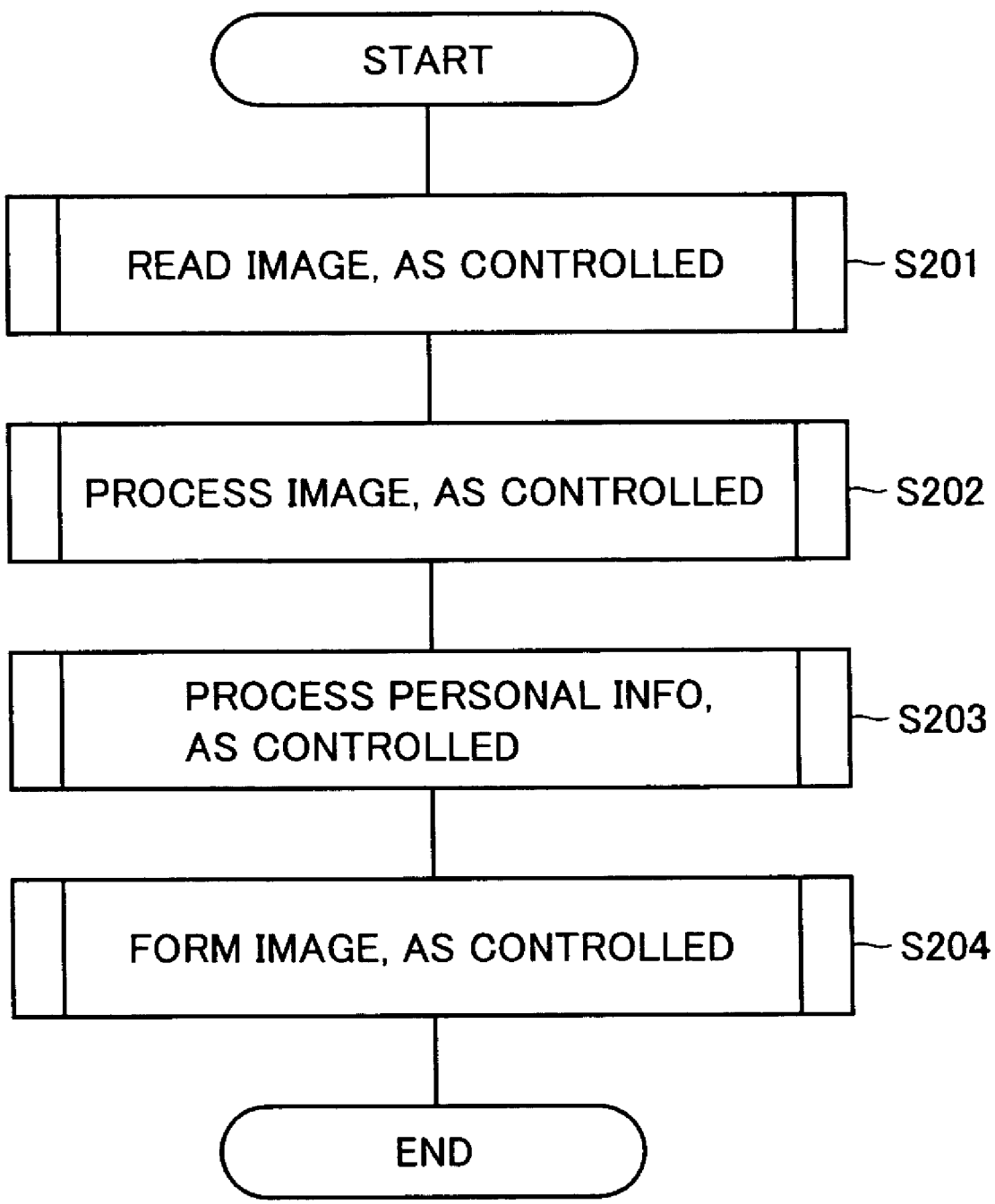
FIG. 3 is a flow chart representing an outline of generally controlling the MFP.

FIG. 3 is a flow chart representing an outline of generally controlling the MFP.

The MFP initially at step S201 reads an image by image reading unit 105, as controlled, to convert an original to electronic data. Then at step S202 image process unit 106 subjects the electronic data of the read image to an image process, as controlled. At step S203, as based on the electronic data of the read image, a personal-information process is performed as controlled.

Finally, at step S204, an image of data having undergone the image process or the personal-information process is formed in image formation unit 107, as controlled. Thus an image is printed out.

Figure 4:
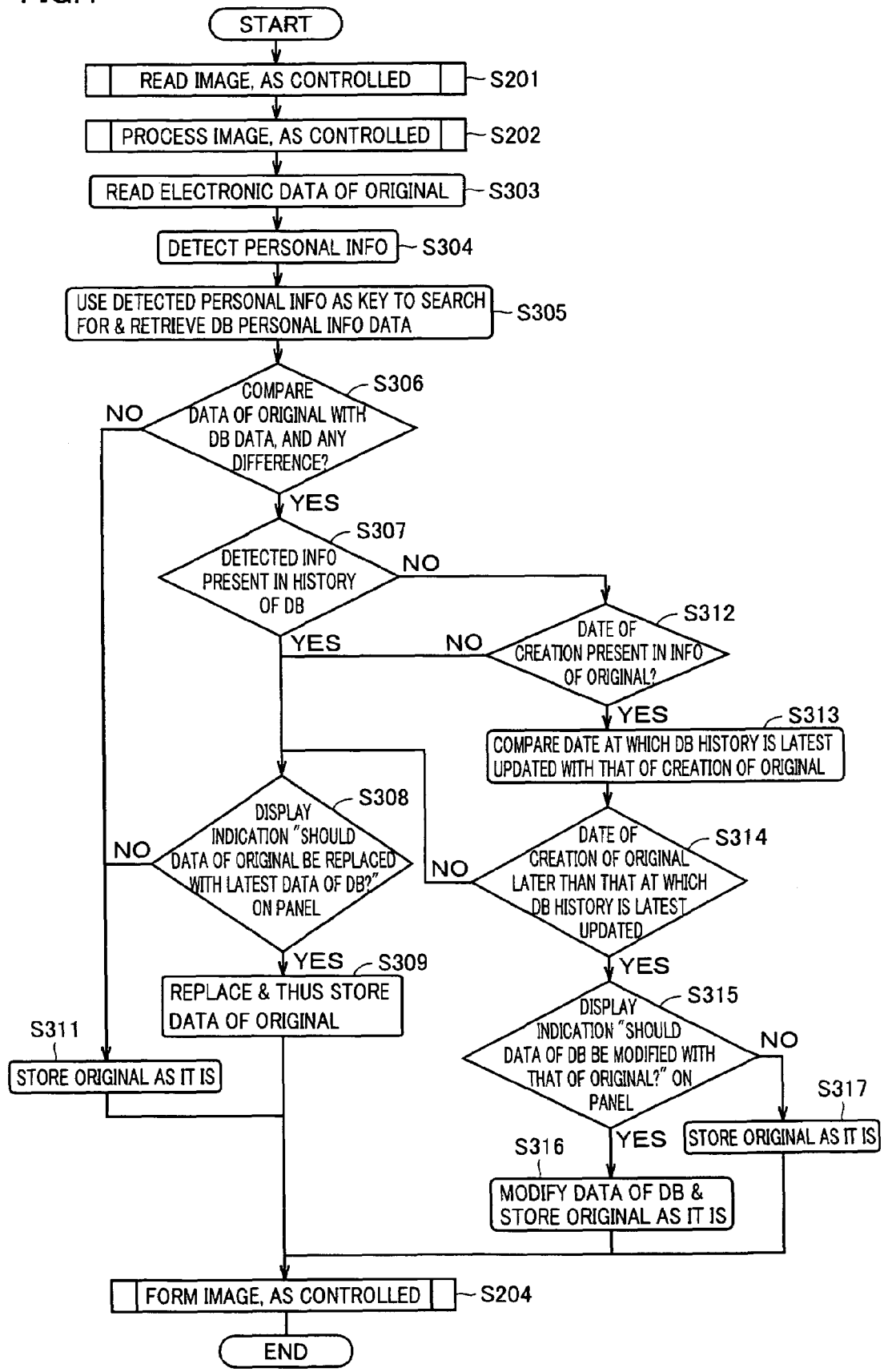
FIG. 4 is a flow chart indicating the FIG. 3 flow chart more specifically.

FIG. 4 is a flow chart more specifically indicating that of FIG. 3.

As has been described above, at step S201 image reading unit 105 reads an image, as controlled, and at step S202 image process unit 106 performs an image process, as controlled. Electronic data having undergone the image process is stored to data storage device 108.

Steps S303-S317 indicate step S203 of FIG. 3 more specifically. At step S303 read-image data detection and updating process unit 110 reads electronic data of an image of an original stored in data storage device 108 and at step S304 detects personal information from the electronic data of the image of the original read.

The personal information is detected as follows: from the image of the original a character region is determined and subjected to character recognition to obtain text information. Whether the text information includes a registered name is searched for. This may be done by whether there is a character string identical to a personal name prepared as a personal-name dictionary, or by whether there is a name identical to that registered in database 111. Furthermore, "TEL", "FAX" and/or a similar key word present in a vicinity of the name is/are searched for and a numerical character following the key word is detected as a telephone number, a facsimile number and/or the like.

Furthermore, a character string preceding the name is assumed as a name of his/her department. To prevent an erroneous discrimination resulting in an erroneous decision that a character string indicates a name of a department despite that the character string is a wrong character string, existing departments' names may previously be registered as a dictionary in the apparatus and only if a character string identical to a name of a department registered is retrieved the character string may be determined as the name of the department. Alternatively, only if a character string identical to a name of a department registered in database 111 is retrieved, the character string may be determined as the name of the department.

Furthermore, the personal information is often located in the image of the original at an upper portion as an address. Accordingly, such portion alone may be subject to detection. Furthermore, if fixed formats for a document for transmission via facsimile, a letter and the like exist, an address, a sender and the like are indicated at predetermined positions. Accordingly, such position may be registered and subject to detection.

A name, a telephone number, a facsimile number, a name of a department and other information that are detected from an image of an original are assumed as personal information associated with an individual determined by the name.

At step S305 database searching and updating process unit 112 accesses database 111 via I/F unit 109, and uses the detected personal information as a key to search through the database for the personal information.

More specifically, a name detected from an image of an original is used as a key to search through the information in the database and read a telephone number, a facsimile number, a name of a department and/or other information stored in the database that correspond to the name. Furthermore, if the name corresponds to a plurality of telephone numbers, facsimile numbers, names of departments and other information stored as a history, then the latest information is read.

At step S306 data comparison unit 113 compares the personal information in the image of the original with that obtained by searching the database (or DB personal information) to examine whether the data have a difference.

For example, if from the image of the original a name, and telephone and facsimile numbers corresponding thereto are detected, then telephone and facsimile numbers stored in the database in association with that name are read, and the former telephone and facsimile numbers are compared with the latter telephone and facsimile numbers.

If there is not a difference (NO at step S306) a decision is made that the personal information in the image of the original is the latest information and at step S311 the original's data is not changed and instead stored in data storage device 108 as it is, and at step S204 the stored data is used to form an image (or transmit the stored data) to complete the process.

If the data have a difference (YES at step S306) then at step S307 a history of database 111 is referred to examine whether the personal information of the image of the original exists in the history of the database.

For example if from the image of the original a name, and telephone and facsimile numbers corresponding thereto are detected, then telephone and facsimile numbers stored in the database in association with that name as a history are read, and the former telephone and facsimile numbers are compared with the latter telephone and facsimile numbers.

More specifically, if the personal information detected from the image of the original fails to match the latest personal information in the database (YES at S306) and is also a history in the database (YES at S307) then the personal information in the image of the original is determined as obsolete personal information and written with the latest personal information in the database.

If the personal information in the image of the original exists in the history of the database (YES at step S307) then a decision is made that data later than the personal information in the image of the original exists in the database and at step S308 a message to the effect "Should the information be replaced with the latest data in the database?" is displayed on operation display unit (or operation panel) 102 and a selection done by the user is received.

If at step S308 "YES" is selected then at step S309 the personal information in the image of the original is replaced with latest personal information obtained by searching the database and is thus stored in data storage device 108 and at step S310 an image is formed to complete the process.

Note that the apparatus may be configured such that displaying the message at step S308 is eliminated and if at step S307 YES is indicated then the control proceeds to step S309.

If at step S308 "NO" is selected then the control proceeds to step S311 to maintain the original's data invariably or unchanged and thus stores it in data storage device 108 and then at step S310 an image is formed to complete the process.

If the personal information in the image of the original does not exist in the history of the database (NO at step S307) then at step S312 read-image data detection and updating process unit 110 detects whether the electronic data of the image of the original includes data indicating the date of creation of the document.

If unit 110 cannot detect such date in the data, a decision is made that the data of the database is the latest data and the control proceeds to step S308.

If at step S312 unit 110 finds the date of creation of the document in the electronic data of the image of the original then at step S313 data comparison unit 113 compares the date at which the database's history is latest updated with the date of creation of the document of the original. For such comparison, in the history of the database, a date of creation of the database, a date of registration with the database, a date of approval of the database, and a date at which the database is updated, are recorded.

If a result of the comparison a decision is made at step S314 that the date at which the database's history is latest updated is later than the date of creation of the document (NO at S314) a decision is made that the data of the database is the latest data and the control proceeds to step S308.

If a result of the comparison a decision is made at step S314 that the date of creation of the document is later than the date at which the database's history is latest updated (YES at S314) then at step S315 a message to the effect "Should the data of the database be modified with the personal information of the original?" is displayed on operation display unit 102 at a selection done by a user is received.

If at step S315 "YES" is selected then at step S316 the personal information of the database is modified with that detected from the original. In doing so, the data in the image of the original is unchanged and thus stored in data storage device 108 as it is, and at step S310 an image is formed to complete the process.

Note that the apparatus may be configured such that displaying the message at step S315 is eliminated and if at step S314 YES is indicated then the control proceeds to step S316.

If at step S315 "NO" is selected then the database is not modified and at step S317 the data in the image of the original is unchanged and thus stored in data storage device 108 as it is, and at step S310 an image is formed to complete the process.

FIG. 5 shows a specific example of a table stored in database 111.

This table represents a database describing personal information of Mr. Taro Suzuki working for a company on his placement history in the company. As the personal information, a name and in association therewith an employee number 401, a name 402, a date of change of placement 403, a name of his department and the like, 404, a telephone number 405, a facsimile number 406, his department and the like's address 408, a data registration date 408 and the like are stored. A history of how the database is updated can be obtained simply by referencing the data registration date. As another indication of the history, although not shown, a date of creation of the database, a date at which the database is updated, a date of approval of the database, and the like may be referenced.

By referencing the FIG. 5 information, a date at which Mr. Taro Suzuki's placement is changed, the name of the department and the like to which he belongs in that placement, a telephone number, a facsimile number and the like can be obtained.

Furthermore, although not shown, database 111 may further hold personal information therein including: gender; birth date; age; height; weight; blood type; medical information; portrait; voice; voice print; nationality; race; ethnicity; job category; title/position; specific task(s) assigned; mail address; date at which one joined a company; length of service; educational background; official qualification(s) processed; training(s) completed; TOEIC point; amount of salary; amount of bonus; amount of asset; amount of liability; amount of credit; record of loan; job history; domicile of origin; current address; home telephone number; mobile phone number; home facsimile number; home mail address; contact address in emergency; family member; position in family; marriage record; divorce record; criminal record; credit number; correspondent bank; bank account number; tendency; hobby; taste and preference; accomplishment; aspiration; religion; philosophy; political party that he/she supports; organization to which he/she belongs; friendship; record of video-rental; record of purchase by mail order; and the like.

Figure 6:
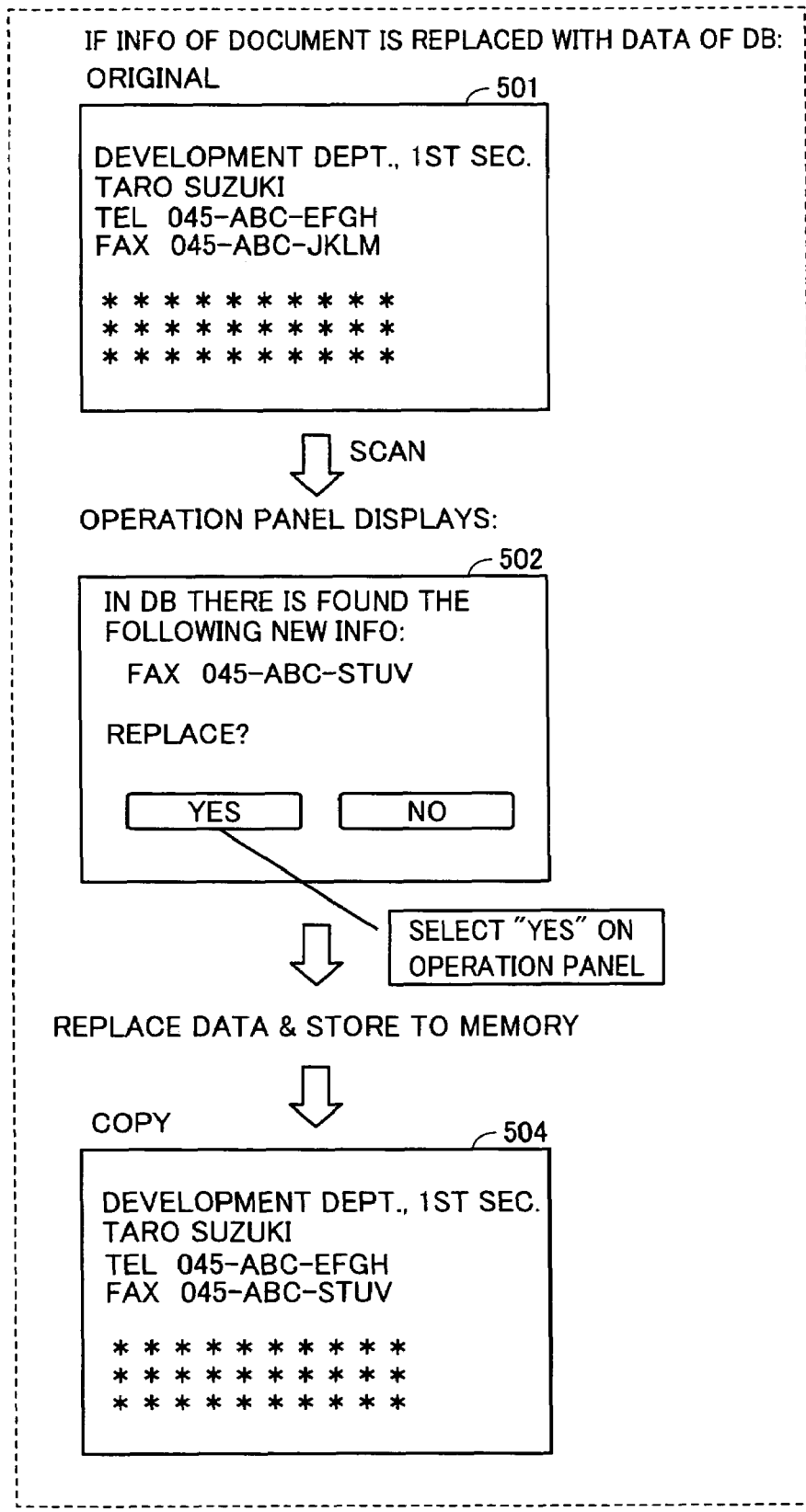
FIGS. 6 and 7 each shows an example in the first embodiment of an indication displayed by the MFP at an operation display unit and an example of an original output.

FIG. 6 shows an example of displaying an indication on the operation display unit of the MFP in the first embodiment and an example of an original output in the same embodiment.

As shown in the figure, the MFP scans an original 501 including a person's name, placement, telephone and facsimile numbers and/or similar personal information for the sake of illustration. The MFP scans original 501 to detect the personal information. Subsequently the MFP accesses the database to search for and thus retrieve personal information associated with the individual specified by the detected personal information and compares the detected personal information with the retrieved personal information. If as a result of comparing the information there is a mismatch recognized between their facsimile numbers and a decision is also made from a history of personal information in the database that the personal information in the database is later information, then the operation panel is controlled to display an indication 502 accordingly to urge the user to select whether the personal information of the original should be replaced.

If the user selects that the personal information of the original should be replaced, then the personal information of the original is replaced with that retrieved from the database and thus stored to data storage device 108. If it is copied in that condition, a result 504 of such replacement process is output.

Figure 7:
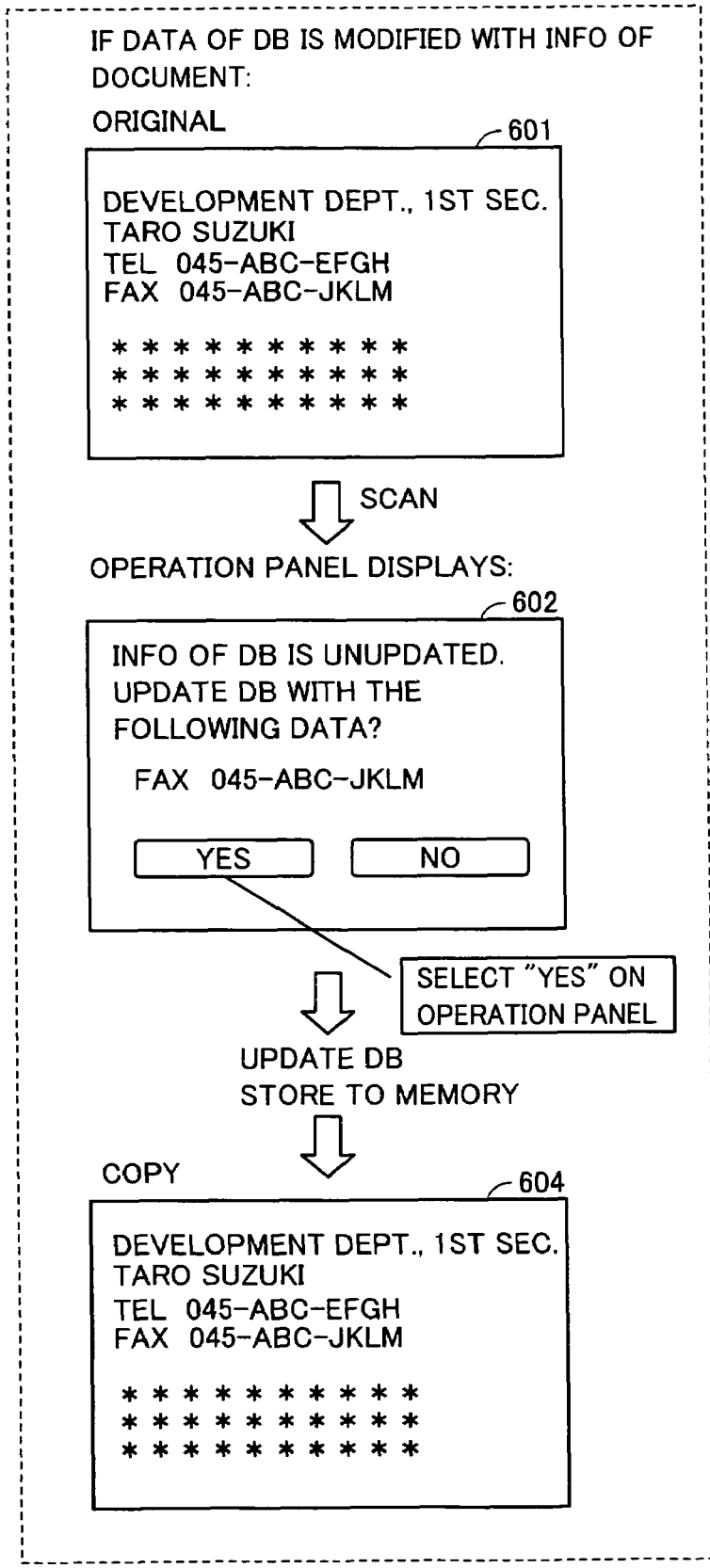

FIG. 7 shows an example of displaying an indication on the operation display unit of the MFP in the first embodiment and an example of an original output in the same embodiment.

As shown in the figure, the MFP scans an original 601 including a person's name, placement, telephone and facsimile numbers and/or similar personal information for the sake of illustration. The MFP scans original 601 to detect the personal information. Subsequently the MFP accesses the database to search for and thus retrieve personal information associated with the individual specified by the detected personal information and compares the detected personal information with the retrieved personal information. If as a result of comparing the information there is a mismatch recognized between their facsimile numbers and a decision is made from a date of creation of a document as detected from image data of the original and a history of personal information in the database that the personal information of the original is later information, then the operation panel is controlled to display an indication 602 accordingly to urge the user to select whether the database should be modified.

If the user selects that the database should be modified then the image data of the original is not at all modified and is exactly stored in data storage device 108. Furthermore the personal information in the database is modified with that detected from the original. If the original is copied in that condition, an image 604 of the original initially scanned is exactly output.

Note that while the present embodiment indicates an example of copying and outputting an original, image data may be attached to e-mail and thus transmitted if the MFP has an e-mail transmission function. Furthermore, if the MFP has a function connecting to a removal memory, image data may be copied to the removal memory and thus output.

In accordance with the above described configuration when the image formation apparatus scans a document the apparatus detects personal information in image data scanned, connects via a network to a database, and searches the database for personal information associated with an individual specified by the detected personal information. The personal information detected from the document and that retrieved from the database are compared with each other, and if the personal information detected from the document and the personal information retrieved from the database have a difference therebetween then a decision is made as to whether the personal information retrieved from the database has date information later than that of the personal information detected from the document. If so then the personal information of the document scanned is modified with that retrieved from the database and thus stored. This can prevent a document including erroneous personal information from being distributed.

Furthermore, if as a result of such comparison the personal information detected from the document and that retrieved from the database have a difference therebetween and the personal information detected from the document has date information later than that of the personal information retrieved from the database then the personal information of the database is modified with that detected from the document. This allows the database to hold latest information and can thus prevent a document from erroneous correction by referring to a date of the database.

Second Embodiment

A second embodiment provides an MFP identical in configuration to that of the first embodiment shown in FIG. 1. Accordingly its description will not be repeated.

Figure 8:
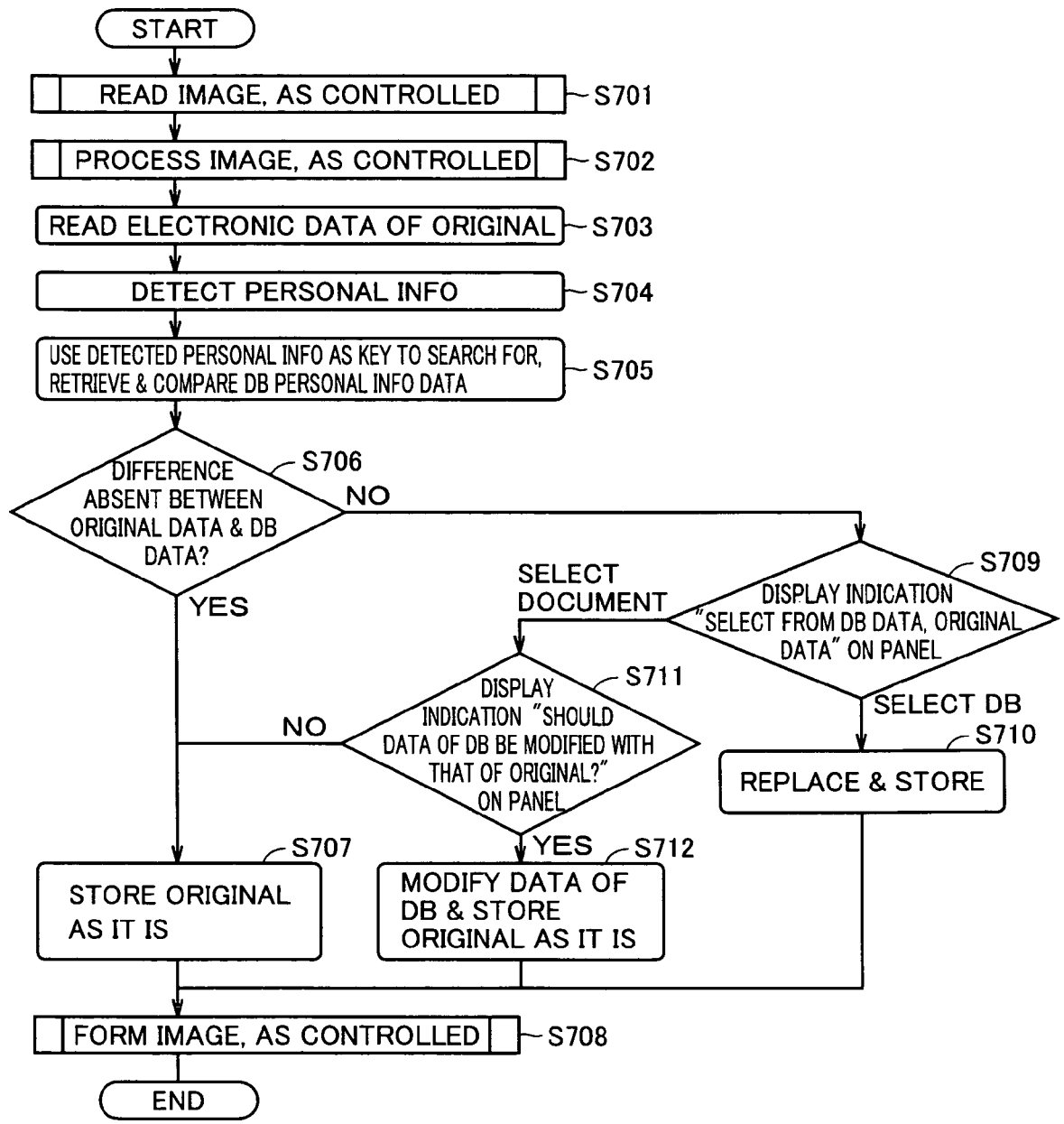
FIG. 8 is a flow chart representing an operation performed by the MFP in a second embodiment.

FIG. 8 is a flow chart for illustrating an operation performed by the MFP in the second embodiment.

At step S701 image reading unit 105 reads an image, as controlled, and at step S702 image process unit 106 performs a image process, as controlled. Electronic data having undergone the image process is stored to data storage device 108.

At step S703, read-image data detection and updating process unit 110 reads electronic data of an image of an original stored in data storage device 108 and at step S704 detects personal information from the electronic data of the image of the original read.

At step S705, database searching and updating process unit 112 accesses via I/F unit 109 to database 111 and uses the detected personal information as a key to search for and thus retrieve latest personal information in the database associated with an individual specified by the detected personal information.

At step S706, data comparison unit 113 compares the personal information in the image of the original with that obtained by searching the database to examine whether the data have a difference. If there is no difference (YES at step S706) a decision is made that the personal information in the image of the original is the latest information and at step S707 the data in the image of the original is not changed and instead stored in data storage device 108 as it is, and at step S708 the stored data is used to form an image to complete the process.

If the data have a difference (NO at step S706) then at step S709 a message to the effect "there is a difference from information of the database", an option presented if a decision is made that there is data in the database that is later than the personal information in the image of the original, i.e., an option to "replace the personal information in the image of the original with the latest data in the database", and in contrast an option presented if the database has its data unupdated, i.e., an option to "use the data of the document" are displayed on operation display unit 102 and the user's selection is received.

If the replacement with the data of the database is selected, then at step S710 the personal information in the image of the original is replaced with that obtained by searching the database and is thus stored in data storage device 108 and at step S708 an image is formed to complete the process.

If the option to use the data of the document is selected then at step S711 that the personal information of the original is the latest data is recognized and to urge the user to update the database a message to the effect "Should the personal information in the database be modified with that of the original?" is displayed on operation display unit 102 and the user's selection is received.

If at step S711 "YES" is selected then at step S712 the personal information in the database is modified with that detected from the original. Furthermore the data of the original is not changed and instead exactly stored in data storage device 108 and at step S708 an image is formed to complete the process.

If at step S711 "NO" is selected then at step S707 the database is not modified and the original also has its data unchanged and thus exactly stored in data storage device 108, and at step S708 an image is formed to complete the process.

Figure 9:
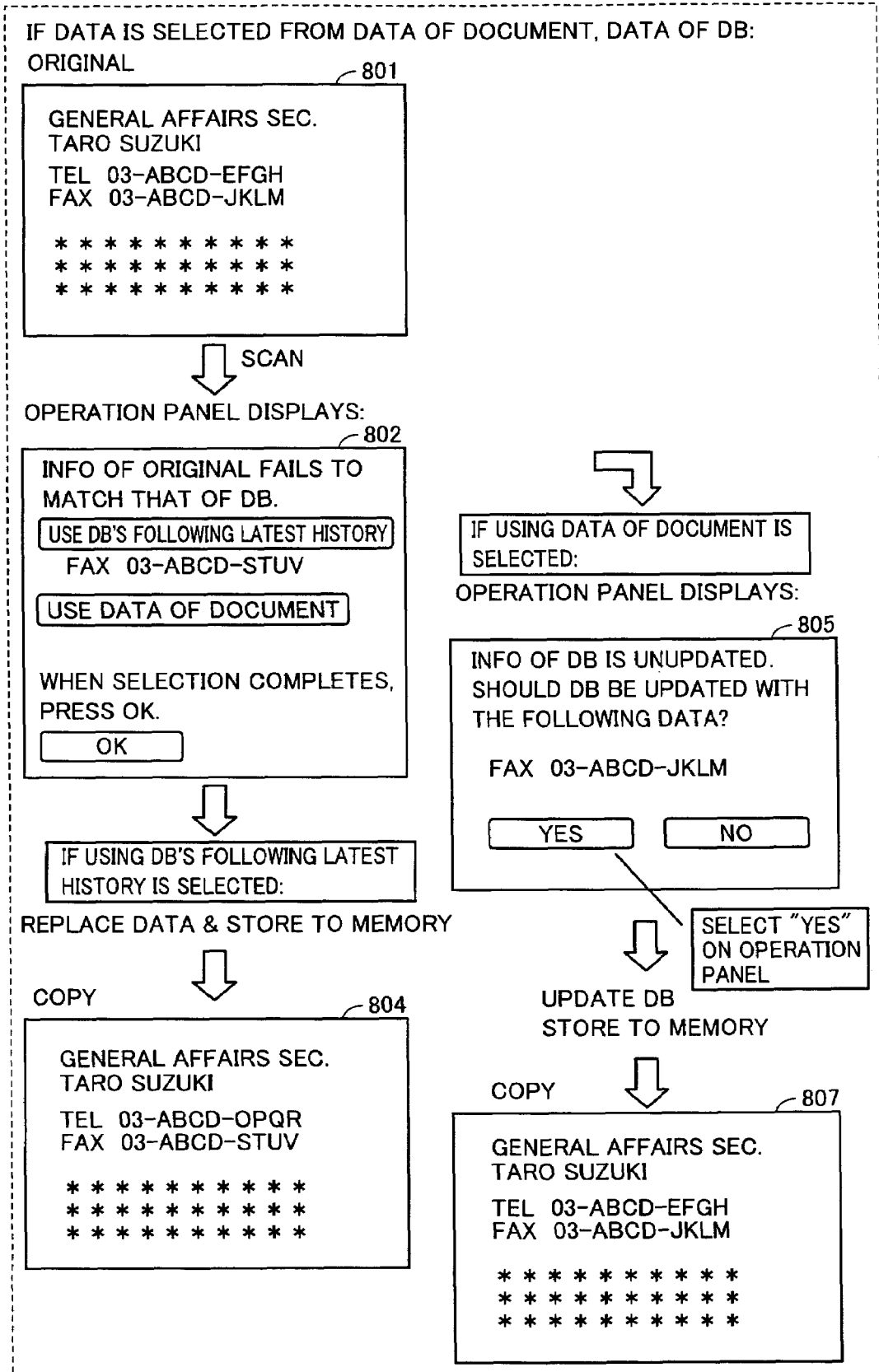
FIG. 9 shows an example in the second embodiment of an indication displayed by the MFP at the operation display unit and an example of an original output.

FIG. 9 shows an example of displaying an indication on the operation display unit of the MFP in the second embodiment and an example of an original output in the same embodiment.

As shown in the figure, the MFP scans an original 801 including a person's name, placement, telephone and facsimile numbers and/or similar personal information for the sake of illustration. The MFP scans original 801 to detect the personal information. Subsequently the MFP accesses the database to search for and thus retrieve personal information associated with the individual specified by the detected personal information and compares the detected personal information with the retrieved personal information. If as a result of comparing the information there is a mismatch recognized between their facsimile numbers then the operation panel is controlled to display an indication 802 accordingly. More specifically, the latest personal information in the database, an option to use that data to replace the personal information of the original or not, and an option to use the personal information of the original as it is or not, are displayed.

If the user selects using the data of the database then the personal information of the original is replaced with that retrieved from the database and thus stored to data storage device 108. If it is copied in that condition, a result 804 of such replacement process is output.

If in response to indication 802 the user selects using the data of the original then an indication 805 is displayed to urge the user to select whether the database should be modified.

If the user selects "YES" then the image data of the original is not at all modified and is exactly stored in data storage device 108. Furthermore the personal information in the database is modified with that detected from the original. If the original is copied in that condition, an image 807 of the original initially scanned is exactly output.

Third Embodiment

A third embodiment provides an MFP identical in configuration to that of the first embodiment shown in FIG. 1. Accordingly its description will not be repeated.

Figure 10:
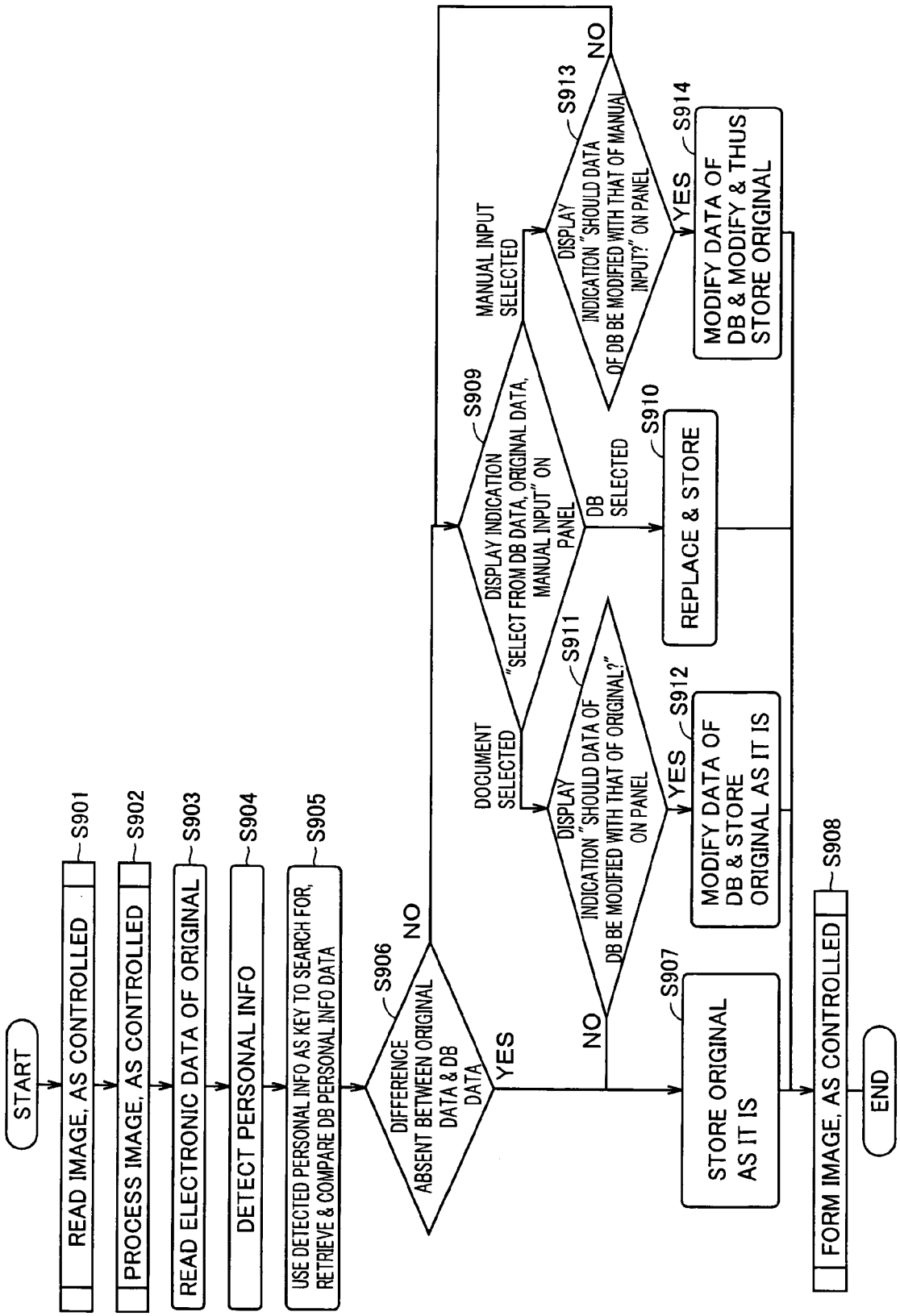
FIG. 10 is a flow chart representing an operation performed by the MFP in a third embodiment.

FIG. 10 is a flow chart for illustrating an operation performed by the MFP in the third embodiment.

At step S901 image reading unit 105 reads an image, as controlled, and at step S902 image process unit 106 performs a image process, as controlled. Electronic data having undergone the image process is stored to data storage device 108.

At step S903, read-image data detection and updating process unit 110 reads electronic data of an image of an original stored in data storage device 108 and at step S904 detects personal information from the electronic data of the image of the original read.

At step S905, database searching and updating process unit 112 accesses via I/F unit 109 to database 111 and uses the detected personal information as a key to search for and thus retrieve latest personal information in the database associated with an individual specified by the detected personal information.

At step S906, data comparison unit 113 compares the personal information in the image of the original with that obtained by searching the database to examine whether the data have a difference. If there is no difference (YES at step S906) a decision is made that the personal information in the image of the original is the latest information and at step S907 the data in the image of the original is not changed and instead stored in data storage device 108 as it is, and at step S908 the stored data is used to form an image to complete the process.

If the data have a difference (NO at step S906) then at step S909 a message to the effect "there is a difference from information of the database", an option presented if a decision is made that there is data in the database that is later than the personal information in the image of the original, i.e., an option to "replace the personal information in the image of the original with the latest data in the database", an option in contrast presented if the database has its data unupdated and the data of the original is the latest data, i.e., an option to "use the data of the document", and an option presented if even the data of the original is not the latest data, i.e., an option to "manually input" are displayed on operation display unit 102 and the user's selection is received.

If the replacement with the data of the database is selected, then at step S910 the personal information in the image of the original is replaced with that obtained by searching the database and is thus stored in data storage device 108 and at step S908 an image is formed to complete the process.

If the option to use the data of the document is selected then at step S911 that the personal information of the original is the latest data is recognized and to urge the user to update the database a message to the effect "Should the data in the database be modified with that of the original?" is displayed on operation display unit 102 and the user's selection is received.

If at step S911 "YES" is selected then at step S912 the personal information in the database is modified with that detected from the original. Furthermore the data of the original is not changed and instead exactly stored in data storage device 108 and at step S908 an image is formed to complete the process.

If at step S911 "NO" is selected then at step S907 the database is not modified and the original also has its data unchanged and thus exactly stored in data storage device 108, and at step S908 an image is formed to complete the process.

If at step S909 the user selects manual inputting then a manually inputting process is performed and at step S913 the manually input information is displayed. This urges the user to confirm the input data and select whether the input data may be used to update the database. If "NO" is selected, then the process returns to step S909 to urge the user to again select which of the data of the database, that of the original and that manually input should be used.

If at step S913 "YES" is selected then at step S914 the personal information in the database is modified with that manually input by the user. Furthermore, the personal information in the image of the original is replaced with that manually input by the user and is thus stored in data storage device 108 and at step S908 an image is formed to complete the process.

Figure 11:
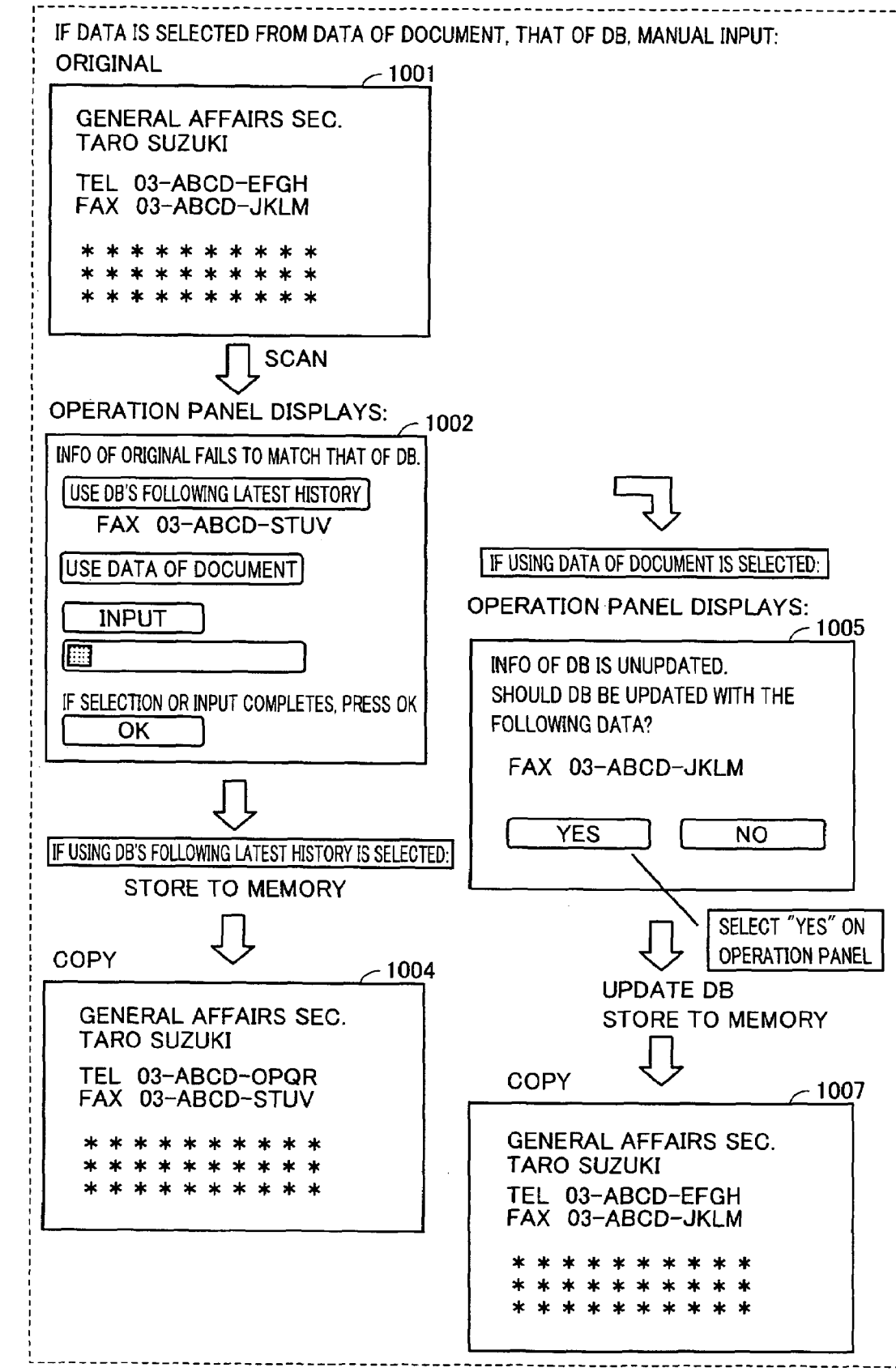
FIGS. 11 and 12 each shows an example in the third embodiment of an indication displayed by the MFP at the operation display unit and an example of an original output.
Figure 12:
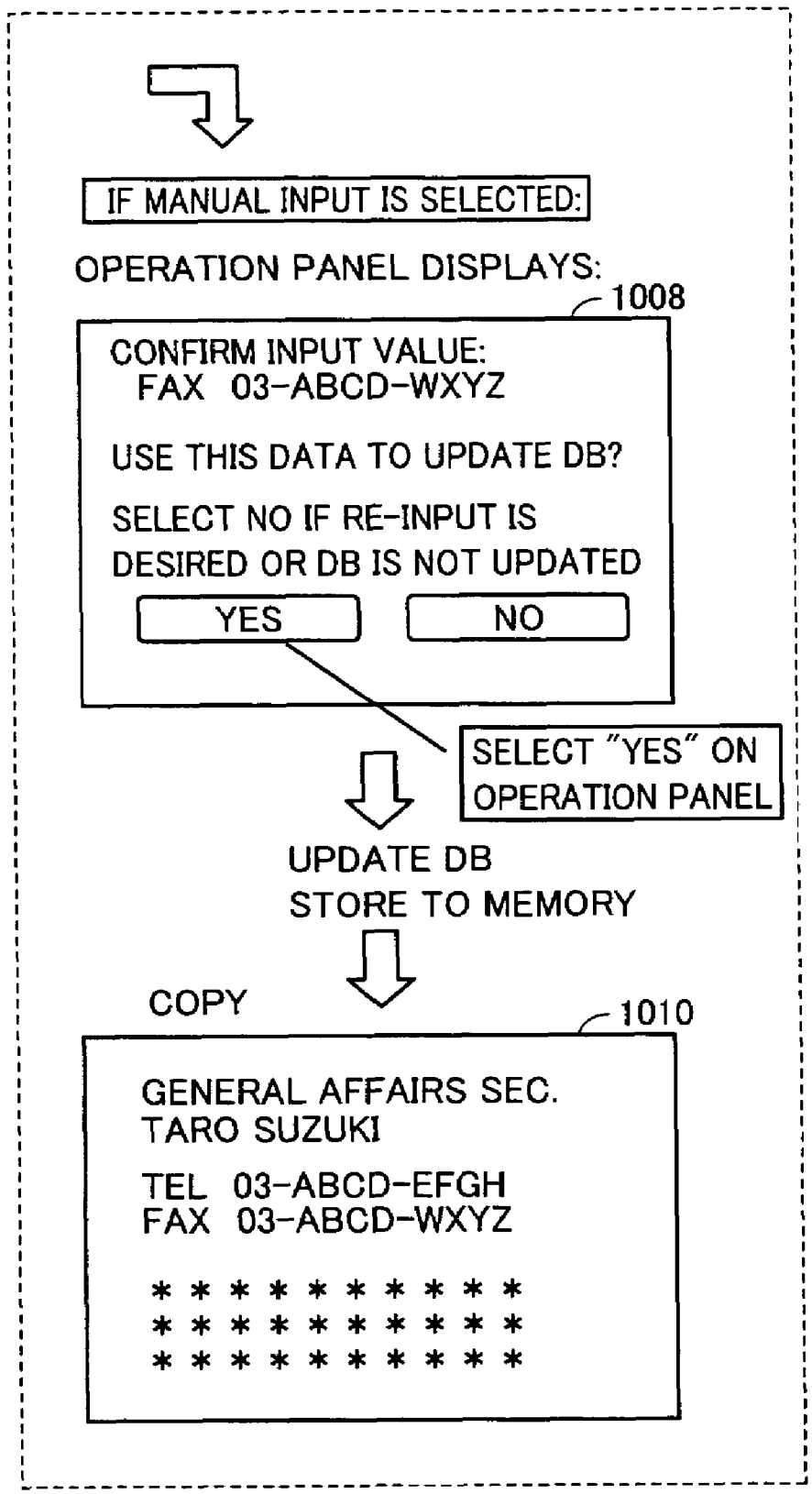

FIGS. 11 and 12 show an example of displaying an indication on the operation display unit of the MFP in the third embodiment and an example of an original output in the same embodiment.

As shown in the figure, the MFP scans an original 1001 including a person's name, placement, telephone and facsimile numbers and/or similar personal information for the sake of illustration. The MFP scans original 1001 to detect the personal information. Subsequently the MFP accesses the database to search for and thus retrieve personal information associated with the individual specified by the detected personal information and compares the detected personal information with the retrieved personal information. If as a result of comparing the information there is a mismatch recognized between their facsimile numbers then the operation panel is controlled to display an indication 1002 accordingly. More specifically, the latest personal information in the database, an option to use that data to replace the personal information of the original or not, an option to use the personal information of the original as it is or not, a box urging the user to manually input information for example when the database's latest data and the original's personal information are both incorrect, and an option to manually input information or not, are displayed.

If the user selects using the data of the database then the personal information of the original is replaced with that retrieved from the database and thus stored to data storage device 108. If it is copied in that condition, a result 1004 of such replacement process is output.

If in response to indication 1002 the user selects using the data of the original then an indication 1005 is displayed to urge the user to select whether the database should be modified.

If the user selects "YES" then the image data of the original is not at all modified and is exactly stored in data storage device 108. Furthermore the personal information in the database is modified with that detected from the original. If the original is copied in that condition, an image 1007 of the original initially scanned is exactly output.

If in response to indication 1002 user selects manually inputting information then as shown in FIG. 12 an indication 1008 is displayed to indicate the input personal information and also urge the user to select whether the database should be modified. If the user selects "YES" then the personal information of the original is replaced with that manually input by the user and is thus stored to data storage device 108 and the personal information in the database is modified with that manually input by the user. The original copied in this condition and thus output is an image 1010 of the original having its personal information replaced with that manually input by the user.

Fourth Embodiment

A fourth embodiment provides an MFP identical in configuration to that of the first embodiment shown in FIG. 1. Accordingly its description will not be repeated.

Figure 13:
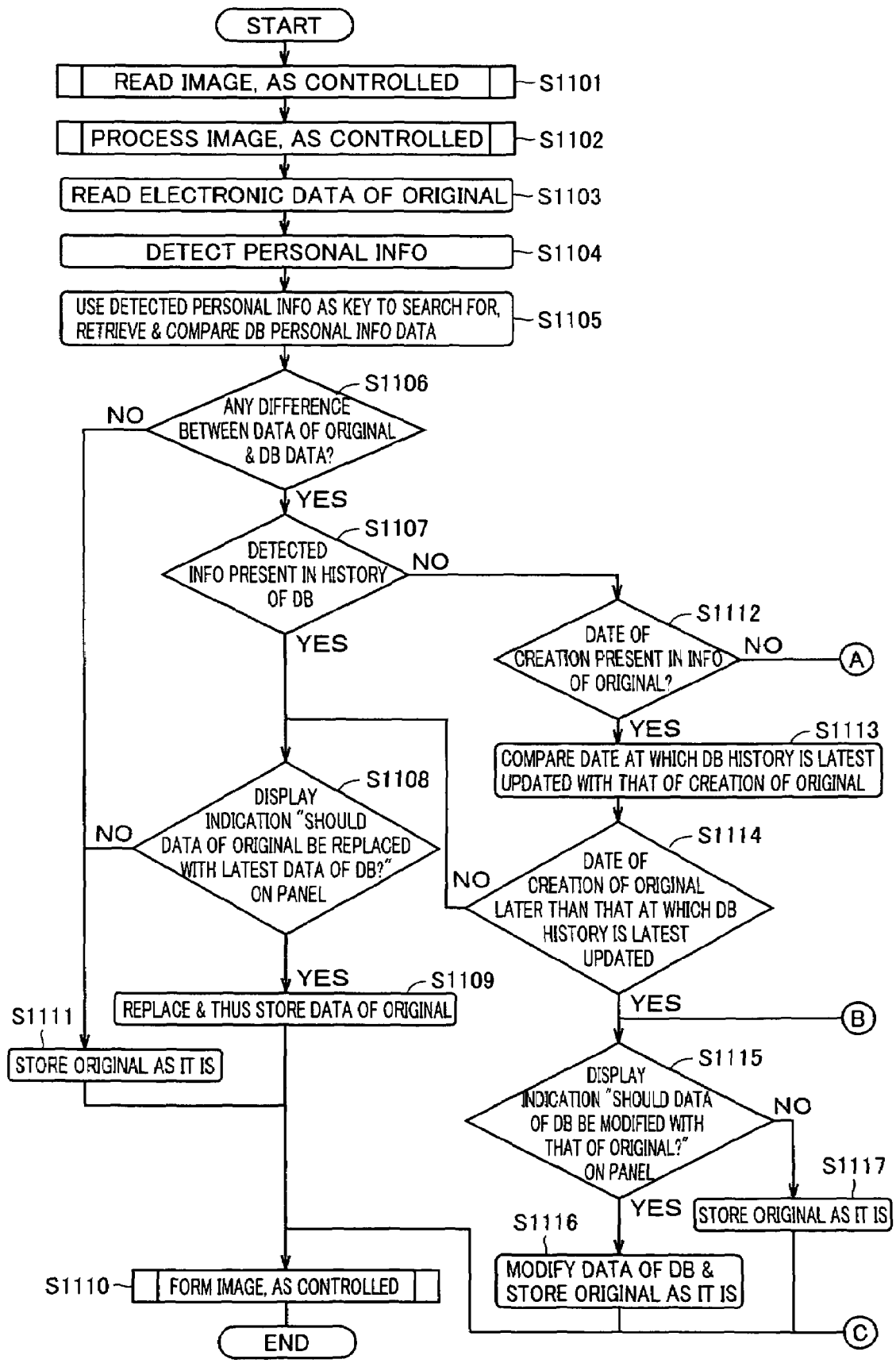
FIGS. 13 and 14 are a flow chart representing an operation performed by the MFP in a fourth embodiment.
Figure 14:
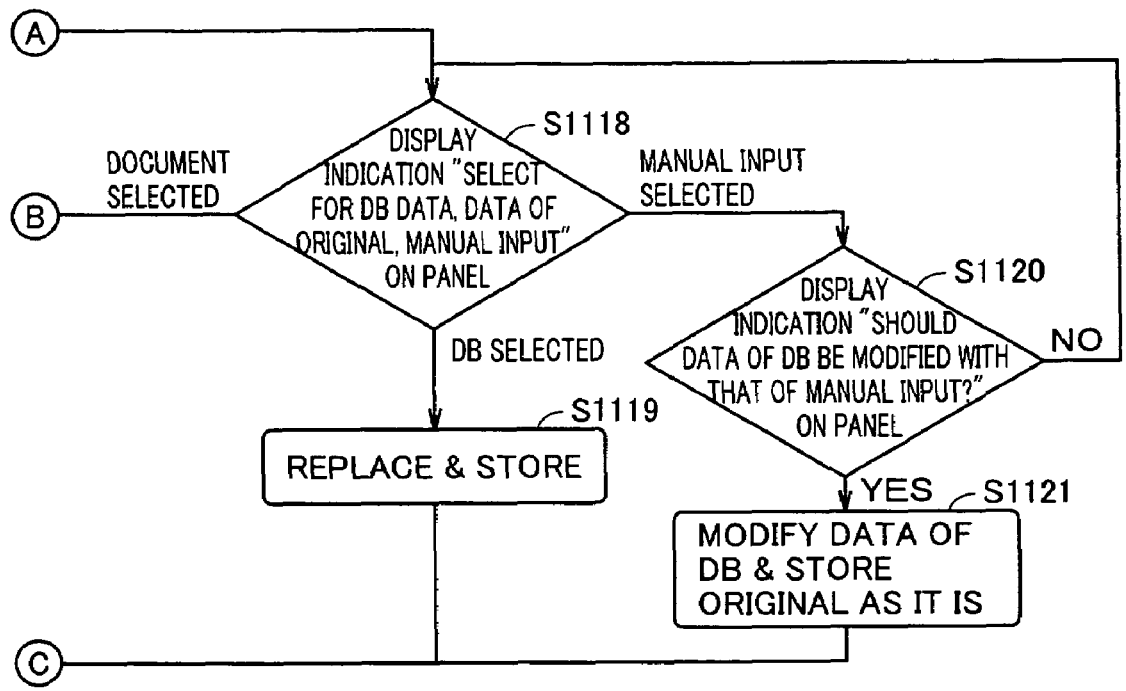

FIGS. 13 and 14 are a flow chart for illustrating an operation performed by the MFP in the fourth embodiment.

In FIG. 13 steps S1101-S1117 will not be described as they are identical to steps S301-S317 shown in FIG. 4.

In the FIG. 13 flow chart if at step S1112 a decision "NO" is made then a process starting at step S1118 shown in FIG. 4 is performed. Steps S1118-S1112 of FIG. 14 are identical to steps S909-S914 of FIG. 10. If at step S1118 a document is selected then the process proceeds to step S1115 shown in FIG. 13 and after step S1119 or S1112 is performed the process proceeds to step S1111 shown in FIG. 13.

In the present embodiment if a date of creation of a document is not detected in electronic data of an image of an original then whether personal information of the original is attributed to a typographical error or is the latest information cannot be determined and accordingly at step S1118 the user is urged to select personal information.

Effects in the Embodiments

The above described configuration can prevent a document including erroneous personal information from being distributed. Furthermore, the above configuration allows a database recording personal information to hold latest information.

Furthermore, the second and subsequent embodiments allow a user to select whether information of a document should be modified or that of a database should be modified. Furthermore, the third and subsequent embodiments also allow personal information to be modified with manually input information.

Others

The present invention can be implemented for MFPs, facsimile devices, copiers, personal computers, and other similar image formation apparatuses.

The process described in the above embodiments may be performed by software or a hardware circuit.

Furthermore, there can also be provided a program executing the process illustrated in the flow charts described in the above embodiments, and the program may be recorded on a CD-ROM, a flexible disk, a hard disk, a ROM, a RAM, a memory card or a similar storage medium and thus provided to users. Furthermore, the program may be downloaded to a device via the Internet or a similar communications line.

Such program is stored for example in ROM 103 and executed by general control unit 101.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
   an acquisition unit acquiring image data by scanning a document;
   a storage unit storing said image data acquired;
   a detection unit detecting first personal information present in said image data acquired;
   a search and retrieval unit searching a database and retrieving therefrom second personal information associated with an individual specified by said first personal information detected;
   a comparison unit comparing said first personal information with said second personal information; and
   a modification unit modifying said personal information present in said image data stored with said second personal information if said comparison unit provides a result indicating that said second personal information is information later than said first personal information, and modifying data present in said database with said first personal information if said comparison unit provides a result indicating that said first personal information is information later than said second personal information.

2. The image reading apparatus according to claim 1, further comprising a decision unit making a decision on whether there is said first personal information as a history of said database, wherein if said decision unit makes a decision that there is said first personal information then said personal information present in said image data stored is modified with said second personal information.

3. The image reading apparatus according to claim 2, wherein said database has recorded therein a date creation of said database, a date of registration of data in said database, a date of approval of said database, or a date at which said database is updated.

4. The image reading apparatus according to claim 1, further comprising:
   a decision unit making a decision on whether there is said first personal information as a history of said database; and
   a determination unit determining a date of creation of said image data acquired, wherein if said decision unit makes a decision that there is not said first personal information then a decision is made, from a result of a determination made by said determination unit and said data of said database, on how late said first personal information is.

5. The image reading apparatus according to claim 4, wherein said database has recorded therein a date creation of said database, a date of registration of data in said database, a date of approval of said database, or a date at which said database is updated.

6. The image reading apparatus according to claim 1, wherein said search and retrieval unit connects via a network to said database to conduct a search and retrieval.

7. An image reading apparatus comprising:
   an acquisition unit acquiring image data by scanning a document;
   a storage unit storing said image data acquired;
   a detection unit detecting first personal information present in said image data acquired;
   a search and retrieval unit searching a database and retrieving therefrom second personal information associated with an individual specified by said first personal information detected;
   a comparison unit comparing said first personal information with said second personal information; and
   a selection unit displaying a result of comparing said first and second personal information by said comparison unit indicating that said first and second personal information have a difference, and receiving that one of said first and second personal information is selected.

8. The image reading apparatus according to claim 7, wherein if said first personal information is selected in said selection unit said storage unit stores said image data acquired without modification.

9. The image reading apparatus according to claim 7, wherein if said second personal information is selected in said selection unit then said personal information present in said image data stored in said storage unit is modified with said second personal information.

10. The image reading apparatus according to claim 7, wherein said personal information present in said image data acquired can be modified with a manual input.

11. The image reading apparatus according to claim 10, wherein said data in said database is modified with data of said manual input.

12. The image reading apparatus according to claim 7, wherein said search and retrieval unit connects via a network to said database to conduct a search and retrieval.

13. A non-transitory computer-readable medium containing an image reading apparatus controlling program product, causing a computer to perform the steps of:
   acquiring image data by scanning a document;
   storing said image data acquired;
   detecting first present in said image data acquired;
   searching a database and retrieving therefrom second personal information associated with an individual specified by said first personal information detected;
   comparing said first personal information with said second personal information; and
   modifying said personal information present in said image data stored with said second personal information if the step of comparing provides a result indicating that said second personal information is information later than said first personal information, and modifying data present in said database with said first personal information if the step of comparing provides a result indicating that said first personal information is information later than said second personal information.

14. A non-transitory computer-readable medium containing an image reading apparatus controlling program product, causing a computer to perform the steps of:
   acquiring image data by scanning a document;
   storing said image data acquired;
   detecting first personal information present in said image data acquired;
   searching a database and retrieving therefrom second personal information associated with an individual specified by said first personal information detected;
   comparing said first personal information with said second personal information; and
   if the step of comparing provides a result indicating that said first and second personal information have a difference, then displaying said result and receiving that one of said first and second personal information is selected.

15. A method of controlling an image reading apparatus, comprising the steps of:
   acquiring image data by scanning a document;
   storing said image data acquired;
   detecting first personal information present in said image data acquired;
   searching a database and retrieving therefrom second personal information associated with an individual specified by said first personal information detected;
   comparing said first personal information with said second personal information; and
   modifying said personal information present in said image data stored with said second personal information if the step of comparing provides a result indicating that said second personal information is information later than said first personal information, and modifiing data present in said database with said first personal information if the step of comparing provides a result indicating that said first personal information is information later than said second personal information.

16. A method of controlling an image reading apparatus, comprising the steps of:
   acquiring image data by scanning a document;
   storing said image data acquired;
   detecting first personal information present in said image data acquired;
   searching a database and retrieving therefrom second personal information associated with an individual specified by said first personal information detected;
   comparing said first personal information with said second personal information; and
   if the step of comparing provides a result indicating that said first and second personal information have a difference, then displaying said result and receiving that one of said first and second personal information is selected.

* * * * *